United States Patent
Ho

Patent Number: 5,251,377
Date of Patent: Oct. 12, 1993

[54] VEGETABLE AND FRUIT PEELER AND PEEL COLLECTOR

[76] Inventor: Tze H. Ho, 3101 Montezuma Ave., Alhambra, Calif. 91803

[21] Appl. No.: 40,111

[22] Filed: Mar. 30, 1993

[51] Int. Cl.⁵ ............................................. A47J 17/02
[52] U.S. Cl. ................................. 30/123.5; 30/124; 30/136.5; 99/588; 99/590; D7/693
[58] Field of Search ................ 99/584, 588, 590; 15/236.01, 105, 257.1; 30/123.5, 124, 128, 136, 136.5, 123.6, 123.7, 278; 206/216; 241/95, 101.2; 452/137

[56] References Cited

U.S. PATENT DOCUMENTS

| | | | |
|---|---|---|---|
| 500,923 | 7/1893 | Mabbett | 30/136.5 |
| 526,585 | 9/1894 | Seaman | 30/136.5 |
| 563,763 | 7/1896 | Geering | 30/136.5 |
| 698,138 | 4/1902 | Reich | 30/136 |
| 875,473 | 12/1907 | Walston | 30/136 |
| 918,893 | 4/1909 | Nielsen | 30/136.5 |
| 1,006,779 | 10/1911 | Nichols | 30/136 |
| 1,380,757 | 6/1921 | Van Sant | 30/136.5 |
| 1,498,156 | 6/1924 | Drew | 30/136 |
| 2,092,550 | 9/1937 | Davis | 99/590 |
| 2,146,419 | 2/1939 | Clarke | 30/136.5 |
| 2,266,209 | 12/1941 | Jones | 30/280 |
| 2,467,589 | 4/1949 | Johansson | 30/124 |
| 2,649,604 | 12/1949 | Hess | 15/236 |
| 2,827,657 | 3/1958 | Bettcher | 452/137 |
| 2,912,755 | 11/1959 | Twyman | 30/128 |
| 3,644,993 | 2/1972 | Chupp | 30/280 |
| 3,734,003 | 5/1973 | Gerson | 99/588 |
| 3,961,418 | 6/1976 | Neveu | 30/123.5 |
| 4,369,574 | 1/1983 | Hsien-Sen | 30/123.5 |
| 4,846,341 | 7/1989 | Lieb | 206/216 |

FOREIGN PATENT DOCUMENTS 713652 10/1941 Fed. Rep. of Germany ........ 99/590

*Primary Examiner*—Timothy F. Simone
*Attorney, Agent, or Firm*—Roberts and Quiogue

[57] ABSTRACT

A vegetable peeler that includes an oval shaped housing having a bottom and an open top, a concavely curved surface formed in the bottom of the oval shaped housing, a slot formed in the concavely curved surface and aligned with the length of the housing, a blade secured inside the housing and projecting through the slot with a curved cutting edge of the blade outside the slot and generally conforming to the curvature of the portion of the concavely curved surface adjacent thereto, and a cover engageable over the open top of the housing.

3 Claims, 2 Drawing Sheets

VEGETABLE AND FRUIT PEELER AND PEEL COLLECTOR

BACKGROUND OF THE INVENTION

The disclosed invention is directed generally to produce vegetable and fruit peelers, and more particularly to an integral vegetable and fruit peeler and peel collector.

Conventional vegetable peelers typically comprise a slotted cutting member that is secured to a handle. The edges of the slot comprise sharp blade edges, and peeling is accomplished by moving the cutting against the vegetable or fruit being peeled, such that one edge of the slot engages the vegetable or fruit and shaves the peel. For ease of movement, the person performing the peeling typically moves the vegetable peeler away from his or her body.

A consideration with conventional vegetable peelers is that the peelings removed thereby get scattered. Another consideration with conventional vegetable peelers is the arm movement required for their use, which may be difficult for persons having limited arm use. A further consideration with conventional vegetable peelers is that they typically have straight cutting edges, which tend to remove more of the desired portion of the vegetable being peeled.

SUMMARY OF THE INVENTION

It would therefore be an advantage to provide a vegetable peeler that does not scatter the resulting peelings.

Another advantage would be to provide a vegetable peeler that is easily utilized without complex arm movements.

A further advantage would be to provide a vegetable peeler that reduces the amount of waste resulting from peeling.

The foregoing and other advantages are provided by the invention in a vegetable peeler that includes an oval shaped housing having a bottom and an open top, a concavely curved surface formed in the bottom of the oval shaped housing, a slot formed in the concavely curved surface and aligned with the length of the housing, and a blade secured inside the housing and projecting through the slot, a curved cutting edge formed on the blade and located outside the slot and generally conforming to the curvature of the portion of the concavely curved surface adjacent thereto, and a cover engageable over the open top of the housing.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
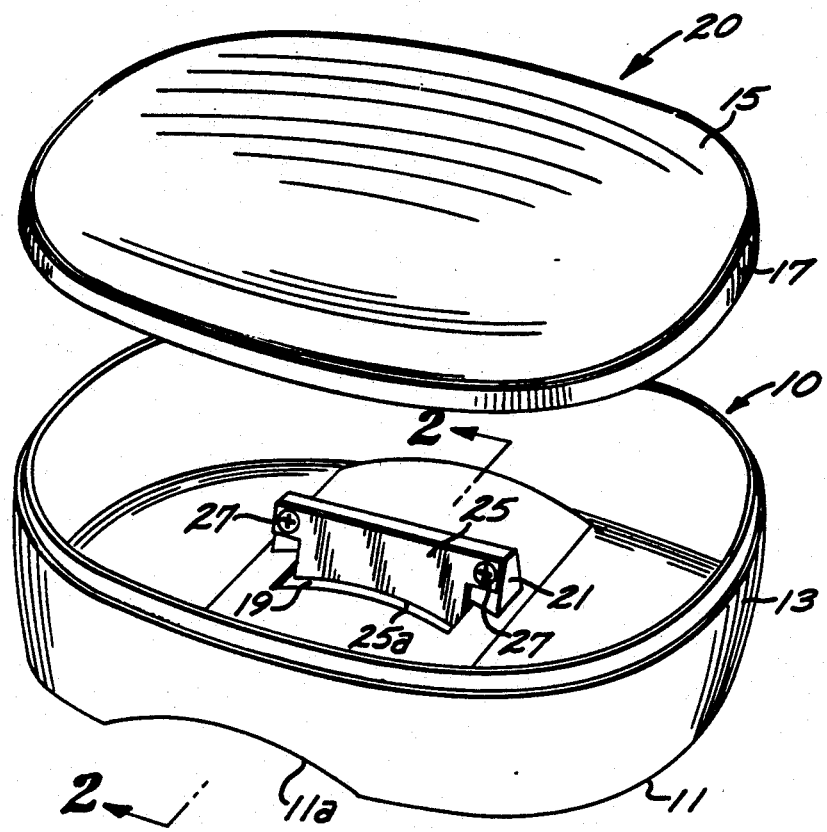
FIG. 1 is a schematic partial exploded perspective view of a vegetable peeler in accordance with the invention.

In the following detailed description and in the several figures of the drawing, like elements are identified with like reference numerals.

Referring now to FIG. 1, schematically illustrated therein is a vegetable peeler in accordance with the invention which includes an oval shaped base housing 10 comprised of an oval shaped bottom panel 11 and an upwardly extending continuous side panel 13 that surrounds the bottom panel 11 and is formed integrally therewith. The side panel 13 of the housing 11 forms an oval shaped upper opening in the housing and includes a recessed upper edge that is recessed on the outer side thereof. The vegetable peeler further includes a removable top cover 20 that is selectively engageable with the opening of the housing. The top cover 20 includes a convex top panel 15 and a downwardly extending rim 17 having a recessed lower edge that is recessed on the inner side thereof and is configured for mating engagement with the recessed upper edge of the side panel 13 of the housing 10.

By virtue of the oval shape of the base housing 10, it has a length along a longitudinal direction and a width along transverse direction, and such directions will be utilized as references for the location and orientation of further components of the vegetable peeler.

Figure 2:
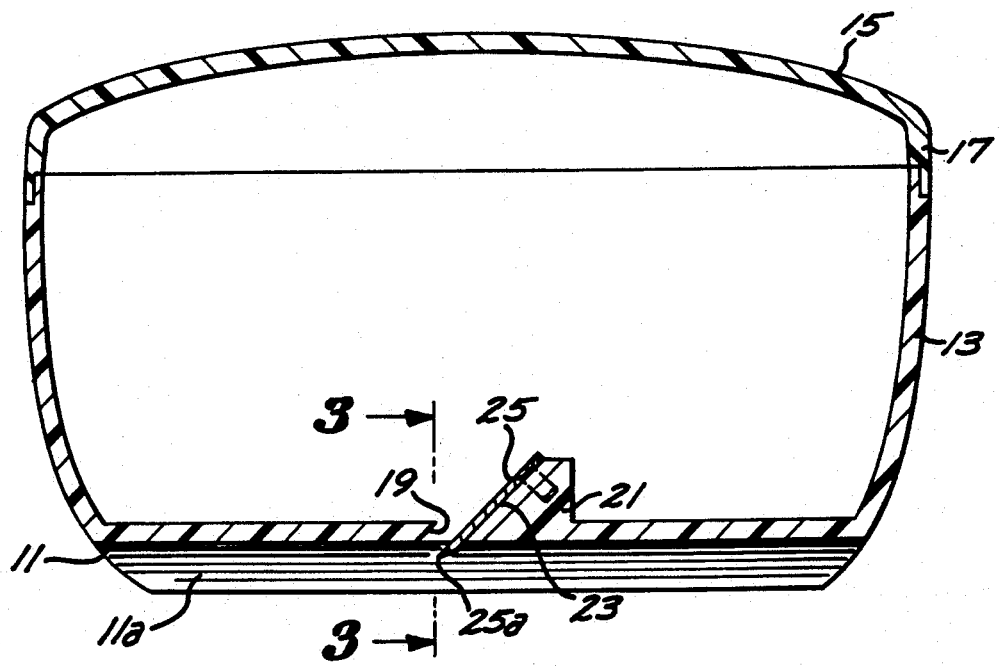
FIG. 2 is a schematic sectional view taken along the width of the vegetable peeler of FIG. 1.
Figure 3:
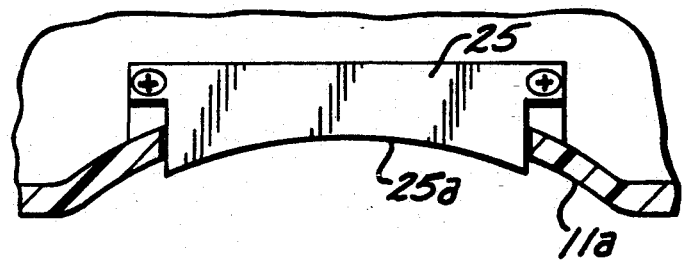
FIG. 3 is a schematic elevational view of the cutting member of the vegetable peeler of FIG. 1.

The bottom panel 11 of the housing includes an inwardly concave portion 11a that extends transversely across the center of bottom panel 11. The inwardly concave portion 11a of the bottom of the housing 10 is curved only along the longitudinal direction of the housing 10. In other words, a vertical cross section taken along the length of the housing 10 would include a curved line that corresponds to the concave portion 11a, while a vertical cross section taken along the width of the housing 10 and through the concave portion as shown in FIG. 2 would include a straight line that corresponds to the concave portion 11a.

An elongated slot 19 is formed in the center of the concave portion of the bottom panel and is oriented with its length aligned with the length of the housing 10. A blade supporting wedge 21 is formed adjacent one side of the elongated slot 19. The blade supporting wedge 21 has an inclined surface 23 that slants away from the slot 19 and supports a cutting blade 25 that is secured against the inclined surface 21 by threaded fasteners 27. The cutting blade 25 projects outwardly through the slot 19 and includes a curved cutting edge 25a having a curvature that generally conforms to the curvature of the concave bottom portion 11a. The cutting edge 25a of the cutter blade 25 is positioned a small distance from the region of the concave bottom portion adjacent thereto.

Figure 6:
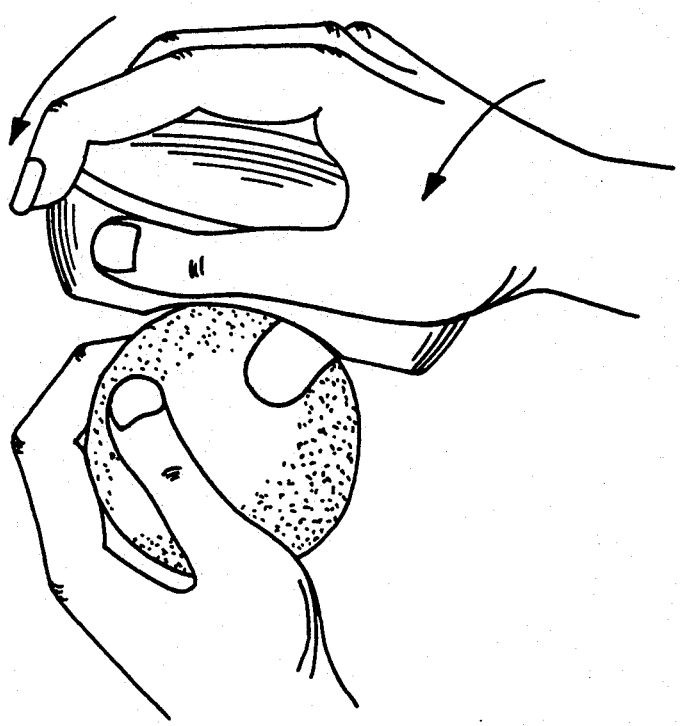
FIG. 6 is schematic depiction of the use of the vegetable peeler of FIG. 1.

In use, the removable top cover 20 is engaged with the housing 10, and the peeler is grasped like a bar of soap with the palm of the hand against the top cover. Peeling can be accomplished with a wiping movement of the housing and cover while the cutting edge 25a of the blade 25 is positioned against the vegetable or fruit being peeled, as schematically depicted in FIG. 6, much like a wiping movement that would be utilized in washing the vegetable or fruit. Peeling is more particularly performed when the cutting blade is moved in a direction that tends to cause the cutting edge 25a of the blade 25 to cut into the vegetable or fruit being peeled, for example to the left in FIG. 2, and the peelings produced by the movement of the cutting blade against the vegetable or fruit being peeled are pushed against the blade and through the slot into the housing where the peelings are stored for later convenient disposal.

Since a wiping movement is predominantly performed by the wrist and hand, very little arm movement is required, which provides for increased stability and safety relative to conventional peelers that require arm movement, and is advantageous for persons who have limited arm movement.

Figure 4:
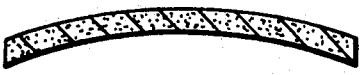
FIG. 4 is a schematic cross sectional view of a peeling produced by the vegetable peeler of FIG. 1.
Figure 5:
FIG. 5 is a schematic cross sectional view of a peeling produced by a conventional vegetable peeler.

As a result of the curved cutting blade of the disclosed vegetable peeler, the resulting peeling is curved as schematically illustrated in cross section in FIG. 4. Since a curved peeling more generally conforms to the peel that is being removed, the vegetable peeler of the invention provides for less waste of the desired vegetable or fruit portion as compared to a conventional peeler which produces a straight cut through the desired vegetable or fruit portion, as schematically illustrated in cross section in FIG. 5.

The foregoing has been a disclosure of a vegetable peeler that stores peelings in an integral container, allows for safe and easy control of the peeler by wrist and hand movement without complex arm movements, and reduces waste.

Although the foregoing has been a description and illustration of specific embodiments of the invention, various modifications and changes thereto can be made by persons skilled in the art without departing from the scope and spirit of the invention as defined by the following claims.

What is claimed is:

1. A vegetable peeler comprising:
    a housing having a bottom and an open top;
    a cover engageable over said open top of said housing, said cover and said housing being configured so as to be easily grasped by a person's hand with the cover resting against the palm of the person's hand;
    a concavely curved surface formed in the bottom of said housing;
    a slot formed in said concavely curved surface; and
    a blade secured inside the housing and projecting through said slot, said blade having a curved cutting edge that is located outside said slot and generally conforming to the curvature of the portion of said concavely curved surface adjacent thereto;
    whereby peelings resulting from use of the vegetable peeler are pushed through said slot into said housing and stored therein.

2. A vegetable peeler comprising:
    an oval shaped housing having a bottom and an open top, said housing having a length and a width that is less than the length;
    a cover engageable over said open top of said housing, said cover and said housing being configured so as to be easily grasped by a person's hand with the cover resting against the palm of the person's hand;
    a concavely curved surface formed in the bottom of said oval shaped housing;
    a slot formed in said concavely curved surface and aligned with the length of said housing; and
    a blade secured inside the housing and projecting through said slot, said blade having a curved cutting edge that is located outside said slot and generally conforming to the curvature of the portion of said concavely curved surface adjacent thereto;
    whereby peelings resulting from use of the vegetable peeler are pushed through said slot into said housing and stored therein.

3. The vegetable peeler of claim 2 wherein said concavely curved surface is curved only along the length of the housing.

* * * * *